United States Patent
So et al.

(10) Patent No.: US 6,480,631 B2
(45) Date of Patent: Nov. 12, 2002

(54) GEOMETRICAL IMAGE PROCESSING APPARATUS AND METHOD OF TRANSFORMING PARTS OF A DIVIDED IMAGE

(75) Inventors: Ikken So; Taro Yokose; Koumei Tomida; Fujio Ihara, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/150,292

(22) Filed: Sep. 9, 1998

(65) Prior Publication Data

US 2002/0048410 A1 Apr. 25, 2002

(30) Foreign Application Priority Data

Nov. 25, 1997 (JP) .............................................. 9-322824

(51) Int. Cl.[7] .................................................. G06K 9/36
(52) U.S. Cl. ........................ 382/248; 382/250; 382/277; 382/281
(58) Field of Search ................................ 382/239, 240, 382/241, 242, 243, 244, 245, 246, 247, 248, 249, 250, 276, 154, 277, 293, 280, 295, 281, 284, 282, 289, 285, 294, 302, 297, 305; 348/413, 401, 400, 402, 412, 416, 409, 404, 405, 384; 711/200, 201–230; 358/431, 432, 433, 426; 345/584–601, 435, 113–119, 427, 433

(56) References Cited

U.S. PATENT DOCUMENTS

| | | | | |
|---|---|---|---|---|
| 5,214,506 A | * | 5/1993 | Lin et al. ..................... 358/183 |
| 5,479,166 A | * | 12/1995 | Read et al. ..................... 341/65 |
| 5,629,779 A | * | 5/1997 | Jeon ............................ 358/432 |
| 5,680,339 A | * | 10/1997 | Moyse et al. ................ 364/745 |
| 5,701,160 A | * | 12/1997 | Kimura et al. ............... 348/413 |
| 5,754,699 A | * | 5/1998 | Sugahara ..................... 382/233 |
| 5,923,789 A | * | 7/1999 | Avinash ....................... 382/276 |
| 6,044,181 A | * | 3/2000 | Szeliski et al. .............. 382/284 |
| 6,078,701 A | * | 6/2000 | Hsu et al. .................... 382/294 |
| 6,115,421 A | * | 9/2000 | Katta et al. .................. 375/240 |
| 6,188,800 B1 | * | 2/2001 | Okitsu ......................... 382/276 |
| 6,249,616 B1 | * | 6/2001 | Hashimoto ................... 382/284 |

FOREIGN PATENT DOCUMENTS

| JP | A-61-161576 | 7/1986 |
|---|---|---|
| JP | A-62-20074 | 1/1987 |
| JP | A-62-140175 | 6/1987 |

* cited by examiner

Primary Examiner—Phuoc Tran
Assistant Examiner—Amir Alavi
(74) Attorney, Agent, or Firm—Oliff & Berridge, PLC

(57) ABSTRACT

The present invention presents an image processing apparatus that performs rotation, enlargement, reduction, clipping or overlapping processing of images at high speed using low capacity memories instead of page memories and without the need to read image data in repetition. A first band data storing element receives input image data line by line and stores it as local data. The local data stored in the first band data storing element is transformed by local data transforming element and then stored in a transformed data storing element. The local data is then read in the order it is to be output and stored in a second band data storing element. An image output element then outputs the local data as an output image.

14 Claims, 19 Drawing Sheets

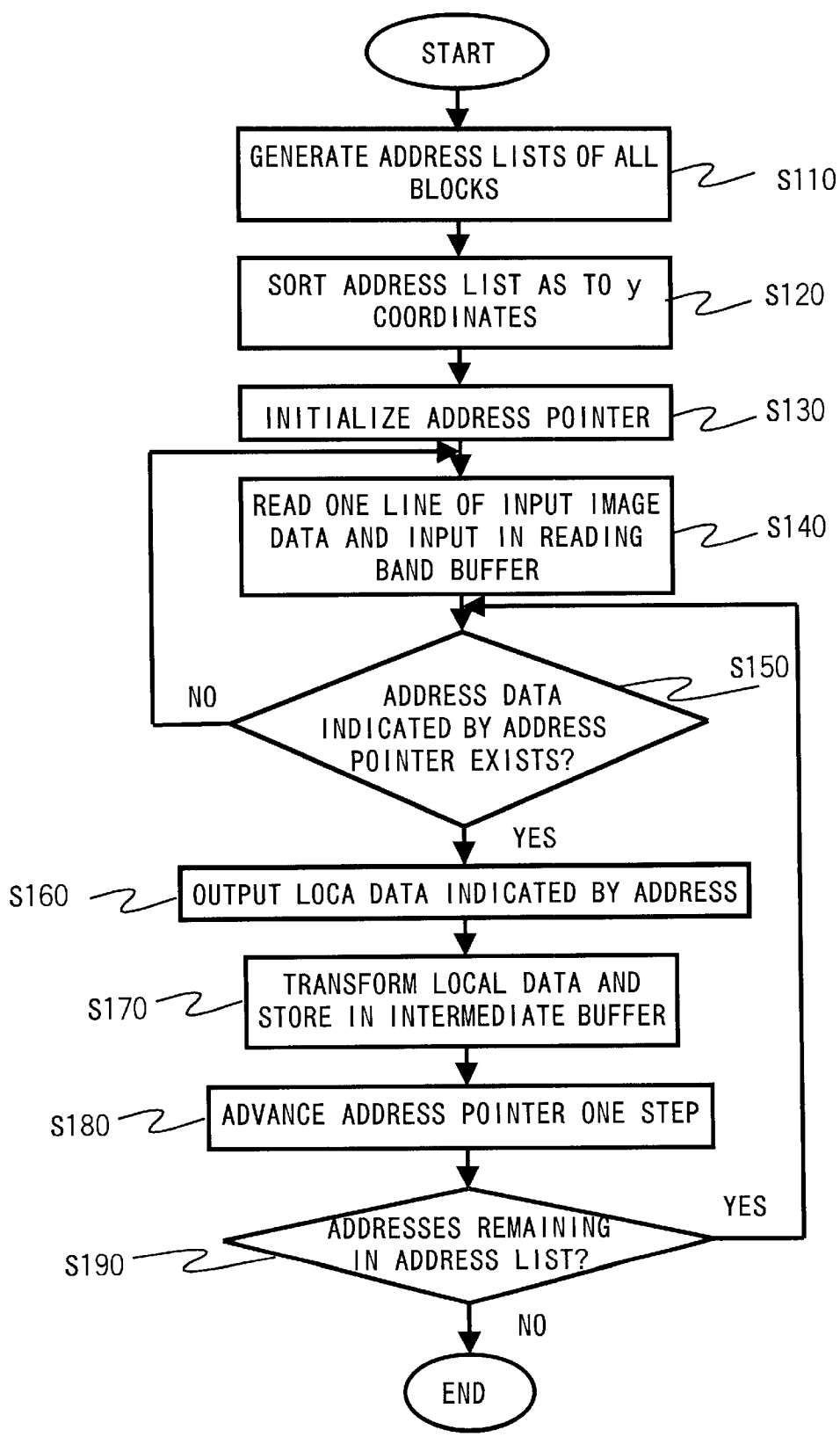

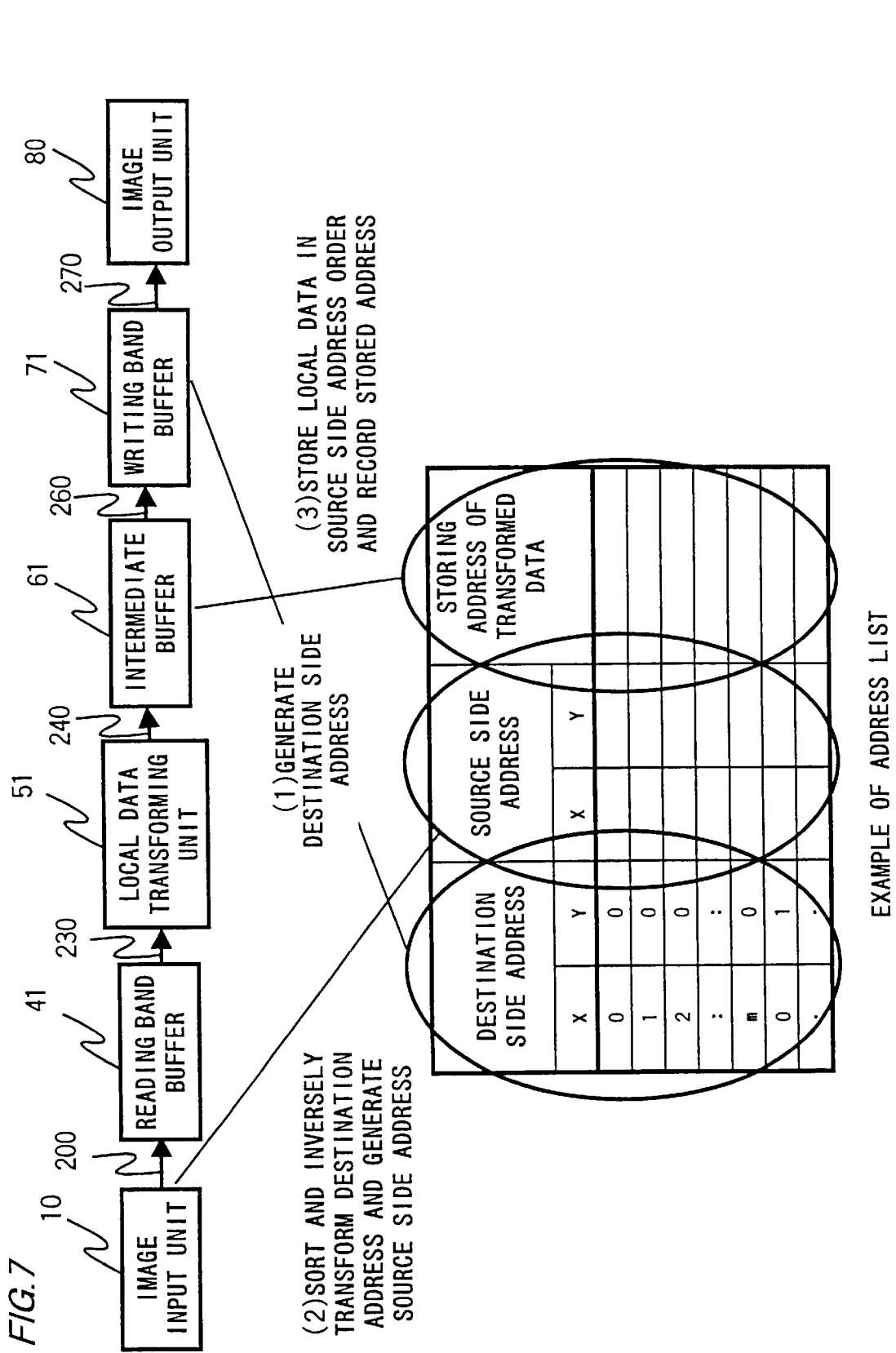

(m, n)

| P00 | P10 | P20 | P30 | P40 | P50 | P60 | P70 |
|---|---|---|---|---|---|---|---|
| P01 | P11 | P21 | P31 | P41 | P51 | P61 | P71 |
| P02 | P12 | P22 | P32 | P42 | P52 | P62 | P72 |
| P03 | P13 | P23 | P33 | P43 | P53 | P63 | P73 |
| P04 | P14 | P24 | P34 | P44 | P54 | P64 | P74 |
| P05 | P15 | P25 | P35 | P45 | P55 | P65 | P75 |
| P06 | P16 | P26 | P36 | P46 | P56 | P66 | P76 |
| P07 | P17 | P27 | P37 | P47 | P57 | P67 | P77 |

$$\begin{pmatrix} m_{rot} \\ n_{rot} \end{pmatrix} = \begin{pmatrix} \cos 45 & -\sin 45 \\ \sin 45 & \cos 45 \end{pmatrix} \times \begin{pmatrix} m \\ n \end{pmatrix}$$

($m_{rot}$, $n_{rot}$)

| | | | | P01 | P10 P00 | | | | |
|---|---|---|---|---|---|---|---|---|---|
| | | | P02 | | P11 | P20 | | | |
| | | P04 P03 | P13 | P12 | P21 P22 | P31 | P40 P30 | | |
| | P05 | P14 | | P23 | P32 | | P41 | P50 | |
| P06 | | P15 | P24 | | P33 | P42 | P51 | | P60 |
| P17 P07 | P16 | P26 P25 | P35 | P34 | P44 P43 | P53 | P62 P52 | P61 | P71 P70 |
| | P27 | P36 | | P45 | P54 | | P63 | P72 | |
| | | P47 P37 | P46 | P56 | P65 P55 | P64 | P74 P73 | | |
| | | | P57 | | P66 | P75 | | | |
| | | | | P67 | P76 P77 | | | | |

GEOMETRICAL IMAGE PROCESSING APPARATUS AND METHOD OF TRANSFORMING PARTS OF A DIVIDED IMAGE

BACKGROUND OF THE INVENTION

1. Field of the Invention

The present invention relates to a technique for image processing. In particular, this invention relates to an image processing apparatus and methods that can rotate, enlarge, reduce, clip and overlap images at low cost and high speed.

2. Discussion of the Related Art

Generally, image processing can be largely divided into two types. One type is geometrical processing which changes the position of the pixels. The other type is pixel value processing which changes the value of the pixels. Examples of geometrical processing are affine transformation, such as rotation, enlargement or reduction of images, and clipping or overlapping of images which cut out pixels. Pixel value processing includes color correction and filter processing.

Among these types of image processing, the rotating process differs substantially from the others. In general, image data is processed in the order of the raster scan, and the result is output in that order as well. On the other hand, when rotating images, the order of input and output of data differs at the source, or input side, and the destination, or output side.

When data is input from the source side according to the raster scan order and is rotated, it is written diagonally on the destination side. In this case, random access of image data is necessary at the destination side. This is called a sequential transform method. When image data is sent so that it appears in the raster scan order at the destination side, random access is necessary at the source side. This is known as an inverse transform method.

In both methods, random access is necessary either on the source side or the destination side. To make random access possible, page memory is used in existing technologies. In the case of the sequential transform method, the rotated image is created in the page memory of the destination side. On the other hand, in the inverse transform method, all images are first written in the page memory and then rotated. Methods that can reduce the amount of time needed for sending image data and for calculating coordinates have been suggested hitherto based on these two methods.

One of these methods is disclosed by Japanese Laid-Open Patent Application No.61-161576. This method aims to increase the speed of the image rotation process by dividing the images into blocks and processing them locally.

FIG. 16 is a block diagram illustrating this method. The image input unit 10 stores input image data 200 in a page memory of the source side 49. The inverse transform coordinate calculating unit 29 calculates the source side coordinate by inversely transforming the center pixel of the local data at the destination side. This coordinate is then output as the inverse transform coordinate 229.

The page memory reading unit 48 sends the source side address of the local data 228 to the source side page memory 49. The inverse transform coordinate 229 is the center of the source side address of the local data 228. The source side page memory 49 stores input image data 200 and sends local data 230 to local data transform unit 51 as indicated by the source side address 228. The local data 230 is, for example, a 3×3 pixel block data.

The local data transform unit 51 reads local data 230 and performs such transform processing as rotation, enlargement or reduction according to the transforming information 231 stored in transforming ROM 52. The local transform unit 51 then outputs the transformed local data 240 to the destination side page memory 79. Page memory writing unit 78 sends the destination side address 269 to the destination side page memory 79, which corresponds to inverse transform coordinate 229. The destination side page memory 79 stores the transformed local data 240 and then sends the local data 270 to image output unit 80 according to the destination side address 269. Image output unit 80 then outputs the output image.

FIG. 17 describes a process in which the rotating process of an image is separated into local rotation and global rotation based on the above method. When local data 400 is rotated around pixel 420, which is the center of rotation, it becomes local data 430. However, since pixels must be aligned either horizontally or vertically, the actual object of the rotation process is to obtain post-rotation local data 450 and its coordinate. In this method, the post-rotation local data 450 is attained by locally rotating local data 430 around post-rotation center pixel 440. According to this method, by tabulating the destination coordinate within local data correspondent to rotation angle α and storing the table in ROM, there is no need to calculate coordinates for every local data since the processing is uniform for all local data. The post-rotation center pixel 440 can be calculated for each local data from the pre-rotation center pixel 410, center pixel 420 and rotation angle α.

As can be seen from the above, the rotation process of this method is characterized by two separate processes: local processing based on transforming ROM 52, and global processing to obtain the address of the local data at its destination. The local processing is simplified enough to be performed at high speed by hardware, and the global processing can reduce the number of calculations. The problem with this method, however, is the high cost of the apparatus as a whole. Page memories are generally very expensive and this method assumes the need for two page memories.

The method explained hereafter reduces the cost of the apparatus by eliminating the need for page memories. This method is used in the inventions of Japanese Laid-Open Patent Applications Nos.62-140175 and 62-20074. In the first method, the rotating process is divided into local processing and global processing. When performing merely local processing, only the memory enough to store local data is needed. The second method eliminates global processing by using only a low-capacity buffer memory and performing the reading process many times across horizontal lines of data. FIG. 18 is a block diagram illustrating this method. The parts_that perform the same function as in FIG. 16 have the same numbers and are therefore, not explained here in repetition.

The buffer reading unit 46 sends to the reading buffer 47 the source side address 227 of local data, the center of which is the inverse transform coordinate 229. The reading buffer 47 stores the input image data 200 in the order of the raster scan and then sends local data 230 to the local data transforming unit 51 according to the source side address information 227. The buffer writing unit 76 sends to writing buffer 77 the destination side address 26 which corresponds to the inverse transform coordinate 229. The writing buffer 77 stores the transformed local data 240, and then sends output image data 270 to the image output unit 80 according to the destination side address 268.

In the above method, the smaller the reading buffer 47, the lower the cost. Reading buffer 47 can be formed when there is enough capacity to store the number of lines needed when rotating local data at least forty-five degrees.

FIG. 19 shows the flow of local data((1)–(6)) from image input to image output. As shown in FIG. 19:

(1) The inverse transform coordinate ($X_{src}$, $Y_{src}$), which corresponds to the center ($X_{des}$, $Y_{des}$) of the local data, is calculated. The input image data is divided into blocks with regard to the coordinates of the destination side.

(2) The local data, the center of which is the inverse transform coordinate, is read and stored in the reading buffer 47. In performing this process, speedy reading by random access is not possible when low-priced hard disks are used. In such a case, all image data comprising the line including the local data in question are read.

(3) The local data, the center of which is the inverse transform coordinate, is read out from the reading buffer 47.

(4) The local data which has been read out in (3) is processed according to the transform ROM 52. Such processes include rotation, enlargement, and reduction.

(5) The processed local data is written in the writing buffer 77 according to the ($X_{des}$, $Y_{des}$) coordinate mentioned in (1).

(6) The image is output once all of the image data are ready in the writing buffer 77.

The reading process (2) is performed so that the data appears in the order of the raster scan at the destination side. This means that at the source side, the reading process is performed many times across the same horizontal lines of data. It is necessary to read the same line a number of times since the reading buffer 47 of this method is presupposed to be small.

It is also possible to perform this method by the sequential transform method. This way, the reading process (2) only needs to be performed once. In this case, however, the process load is generally heavier compared to the reverse transform method since there is a need for a mechanism to rearrange the output image.

Using this method, it is possible to reduce the total cost because small capacity buffers for input and output are used instead of expensive page memories. However, since it is necessary to repeatedly read the same image at the source side, the speed of processing is very slow.

SUMMARY OF THE INVENTION

The present invention includes an image inputting element that sends input image data into a first band data storing element line by line in the order of the raster scan. An address control element sends source side address information to the first band data storing element and destination side address information to a transformed data storing element. The first band storing element outputs local data indicated by the source side address information to a local data transforming element which performs the rotating, enlarging and/or reducing of the image data.

The local data transforming element outputs the transformed local data to the transformed data storing element. The transformed local data storing element stores the transformed local data and outputs the transformed local data indicated by the destination side address information received from the address control element. The data output from the transformed local data storing element is stored in a second band data storing element. The second band data storing element outputs the stored transformed local data to an outputting element as output image data from which a transformed image may be reconstructed.

An aspect of the present invention is that the first and second band data storing elements may be ring buffers or double buffers. Another aspect is that the processing of the input image data may be performed in macro blocks comprised of two or more local data.

In another embodiment of the present invention, the transformed local data storing element further includes an image compressing unit and a compressed data storing unit. The image compressing unit compresses the transformed local data using at least one of a discrete cosine transform, a discrete Fourier transform, a discrete sine transform, a lapped orthogonal transform, a Hadamard transform, a Wavelet transform and a sub-band coding. The data stored in the compressed data storing unit is data compressed by the image compressing unit using at least one of the above transforms. Additionally, the data stored in the second band buffer may be either compressed data or uncompressed data.

In another embodiment of the present invention, the address control unit includes an address list generating unit that generates an address list showing the relationship between the coordinates of the input image data and the coordinates of the output image data. This embodiment also includes an address list sorting unit that rearranges the address list according to a processing order of the input image data.

In yet another embodiment of the present invention, the address control unit includes at least one of a clipping information generating unit and an overlapping information generating unit that outputs at least one of clipping information and overlapping information. In this embodiment, the address list generating unit generates the address list according to a processing order of the output image data based on at least one of the clipping information and the overlapping information.

In the method of the present invention, image data is input and each local data which constitute the image data is transformed into transformed local data by performing a predetermined image processing upon the local data. The transformed data is stored and read in the order that it is to be output. The transformed local data is rearranged into portions of an output image. The rearranged transformed local data is then output as an output image.

The method further includes sending the input image data to a first band storing element line by line in the order of the raster scan; receiving source side address information and destination side address information; transforming the local data indicated by the source side address information into transformed local data by performing at least one of rotating, enlarging and reducing the local data; storing the transformed local data; outputting the transformed local data indicated by the destination side address information to a second band storing element; and outputting the stored transformed local data as output image data from which a transformed image is reconstructed.

An aspect of the method is that the first and second band data storing elements may be ring buffers or double buffers. Another aspect is that the processing of the input image data may be performed in macro blocks comprised of two or more local data.

In another embodiment of the present invention, the method further includes compressing the transformed local data using at least one of a discrete cosine transform, a discrete Fourier transform, a discrete sine transform, a lapped orthogonal transform, a Hadamard transform, a Wavelet transform and a sub-band coding. In another embodiment of the present invention, the method includes generating an address list showing the relationship between the coordinates of the input image data and the coordinates of the output image data. This embodiment also includes rearranging the address list according to a processing order of the input image data.

In yet another embodiment of the present invention, the method includes generating at least one of clipping information and overlapping information. In this embodiment, the address list is generated according to a processing order of the output image data based on at least one of the clipping information and the overlapping information.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings:

FIG. 5 is a flow chart showing the first part of the operation of the first embodiment of the present invention;

FIG. 7 shows an example of an address list in the first embodiment of the present invention;

DETAILED DESCRIPTION OF THE PREFERRED EMBODIMENTS

Figure 1:
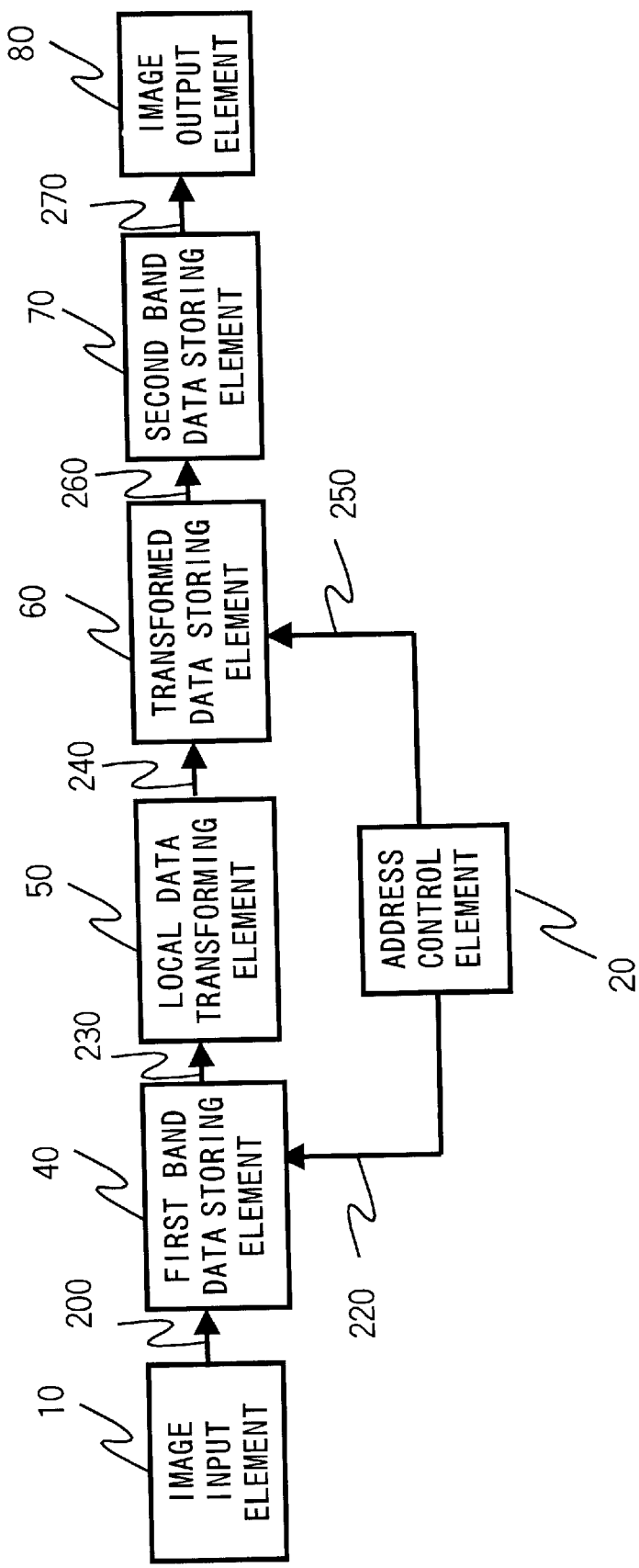
FIG. 1 is an exemplary block diagram illustrating the construction of an image processing apparatus according to the present invention.

FIG. 1 shows the construction of the present invention. As shown in FIG. 1, an image input element sends input image data 200 line by line in the order of the raster scan to a first band data storing element 40. An address control element 20 sends the source side address information 220 to the first band data storing element 40, and the destination side address information 250 to a transformed data storing element 60.

The first band data storing element 40, which is large enough to easily store local data, has a band buffer that discards the oldest line of stored data when a new line of image data is input in the order of the raster scan. The first band data storing element 40 also stores data in the form of a band (hereinafter referred to as band data) in the band buffer. The first band data storing element 40 outputs local data 230 in the band buffer indicated by the source side address information 220.

A local data transforming element 50 performs such transforming functions as rotating, enlarging and reducing of image data and outputs the transformed local data 240 of the local data 230 to the transformed data storing element 60. The transformed data storing element 60 possesses a randomly accessible intermediate buffer which can temporarily store the transformed local data 240 and outputs the transformed local data 260 indicated by the destination side address information 250. A band data storing element 70 also has a band buffer which has enough capacity that can easily store local data. After storing transformed local data 260 in this band buffer, the band data storing element 70 sends the output image data 270 to an image output element 80. The image output element 80 receives the output image data 270 band by band and outputs them to other memory storing apparatuses or external devices such as a printer, a communications network, a display, and the like.

Figure 2:
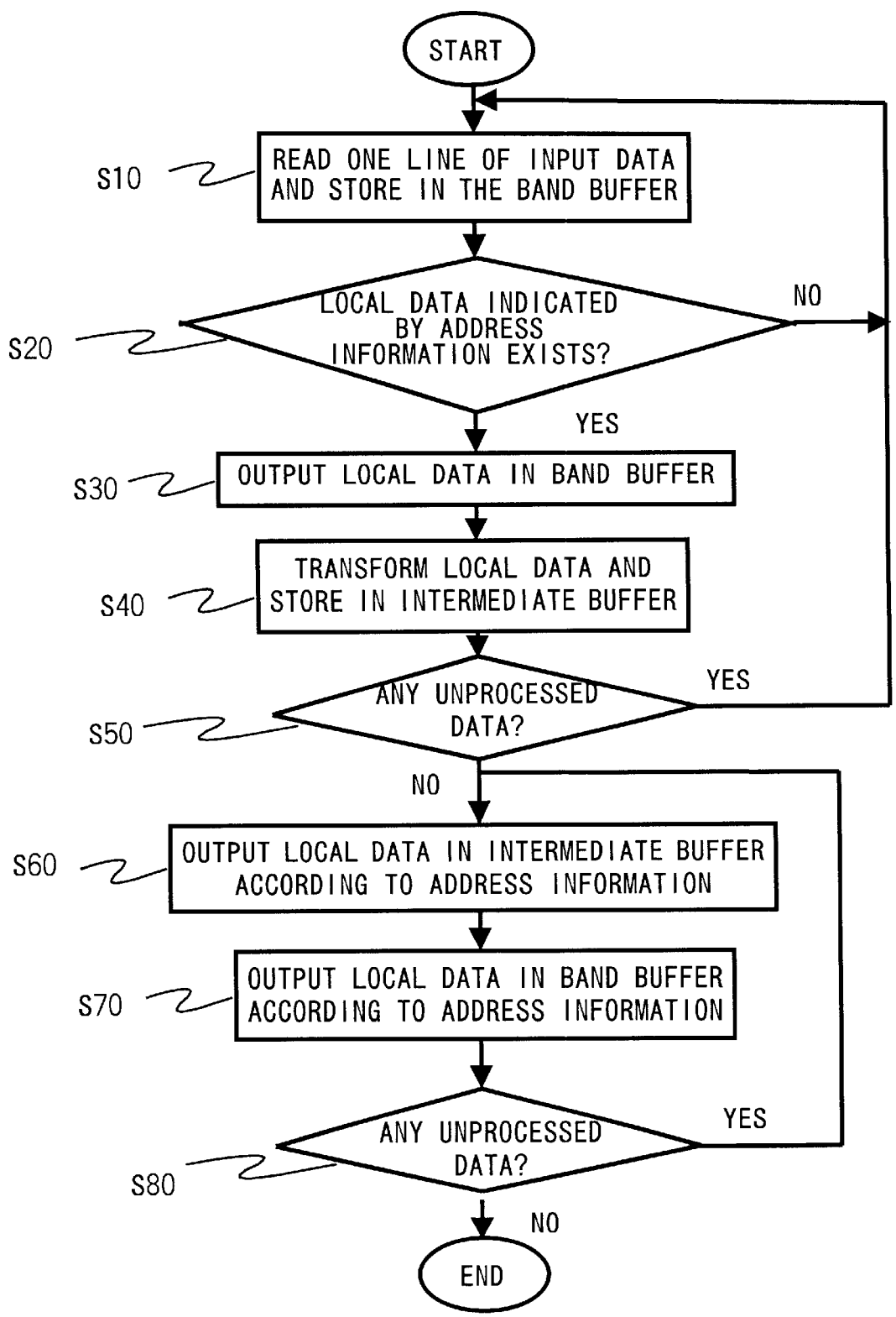
FIG. 2 is a flow chart showing the operations of the present invention.

FIG. 2 shows the flow of data based on the above construction of the image processing apparatus according to the present invention.

In step S10, one line of the input image is read and stored in the band buffer. In step S20, it is determined if the local data indicated by the source side address information 220 exists in the band buffer of the first band data storing element 40. If such local data exists in the band buffer, the process proceeds to step S30. If it does not exist, the process repeats step S10.

In step S30, the local data inside the band buffer indicated by the source side address information is sent to local data transforming unit 50. In step S40, the local data undergoes such transforming processes as rotation, enlargement or reduction and is stored in the transformed data storing element 60, in its intermediate buffer. In step S50, it is determined if all necessary processes up to this step have been performed on the input image data. If all processes are completed, the process proceeds to step S60. If not, the process returns to step S10. In step S60, the transformed local data 260 stored in the intermediate buffer is sent to the band buffer in the second band data storing element 70 according to the destination side address information 250. In step S70, the local data 270 stored in the band buffer is sent to the image output element 80. In step S80, it is determined if all necessary processes are complete. If all processes are completed, the processing of the input image is finished. If not, the process returns to step S60.

With this apparatus there is no need to repeatedly read the input image. The input image is read just once in the order of the raster scan and divided into local data. Each local data is processed and stored in an intermediate buffer (transformed data storing element 60). The local data then undergoes global rotation, or parallel transfer, as they are stored again in a band buffer(second band data storing element 70), producing an output image as a result of such transform process as rotation, enlargement or reduction. Moreover, these transform processes can be obtained by low capacity buffers thereby eliminating the need for page memories.

First Embodiment

The first embodiment of the present invention performs a rotating process using band buffers. The rotation process explained hereafter uses the inverse transform method for illustration purposes. Since the inverse transform method performs the rotating process based upon the position of the output pixels, a more accurate rotation process is assured. It is also possible to adopt a sequential transform method and the like instead of the inverse transform method.

Figure 3:
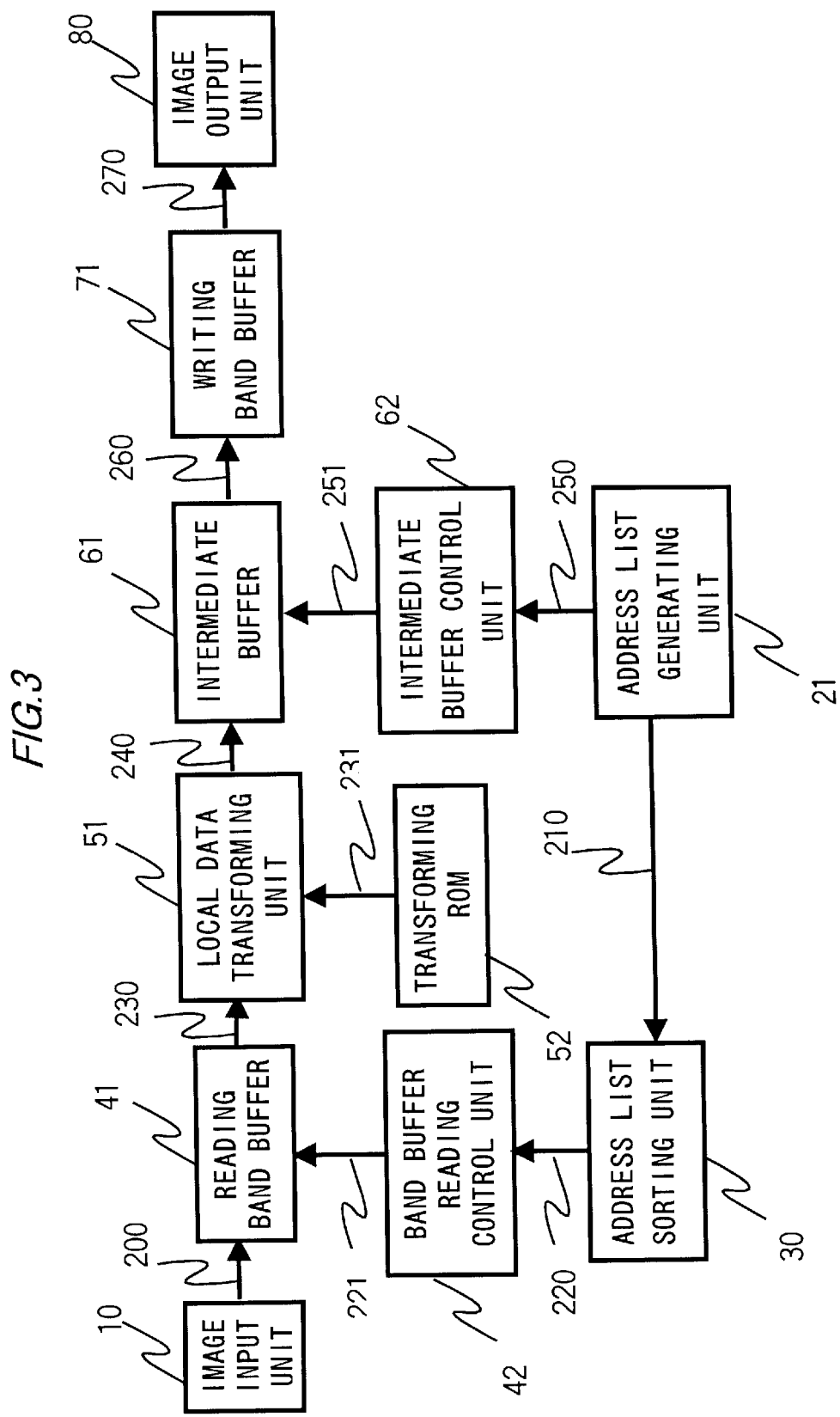
FIG. 3 is an exemplary block diagram illustrating the construction of a first embodiment of an image processing apparatus according to the present invention.

FIG. 3 is an exemplary block diagram illustrating the construction of the first embodiment of the present invention. As shown in FIG. 3, an image input unit 10 reads and outputs input image data 200 in the order of the raster scan. An address list generating unit 21 outputs the destination side address list 250 and the source side address list 210 which can be obtained by an inverse transform process.

An address list sorting unit 30 possessing a sorting function for y coordinates sends out the sorted source side address list 220 sorted based on the y coordinates. A band buffer reading control unit 42 controls the reading band buffer 41 according to the source side address list 220 by outputting a control signal 221 to the reading band buffer 41. A local data transforming unit 51 outputs local data 240 which has been transformed by a transforming ROM 52 based upon local data 230 and the transform coordinate 231 of the local data. An intermediate buffer control unit 62 outputs a control signal 251 to the intermediate buffer based on the destination side address list 250. The intermediate buffer 61 stores the transformed local data and outputs the transformed local data 260 when necessary. A writing band buffer 71 stores the transformed local data and successively outputs the buffer data 270. An image output unit outputs the output image based on the buffer data 270.

Figure 4:
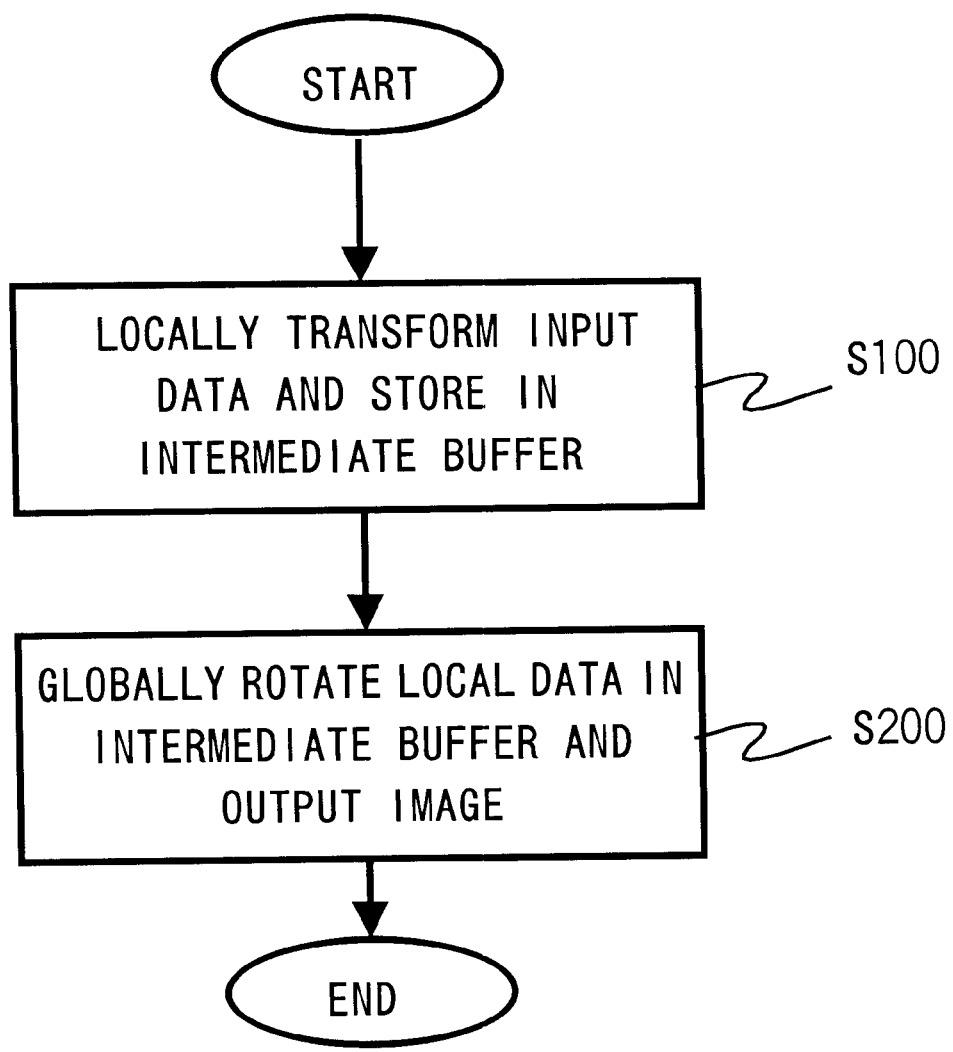
FIG. 4 is a flow chart showing that the overall operation of the first embodiment of the present invention is divided into two parts.
Figure 8:
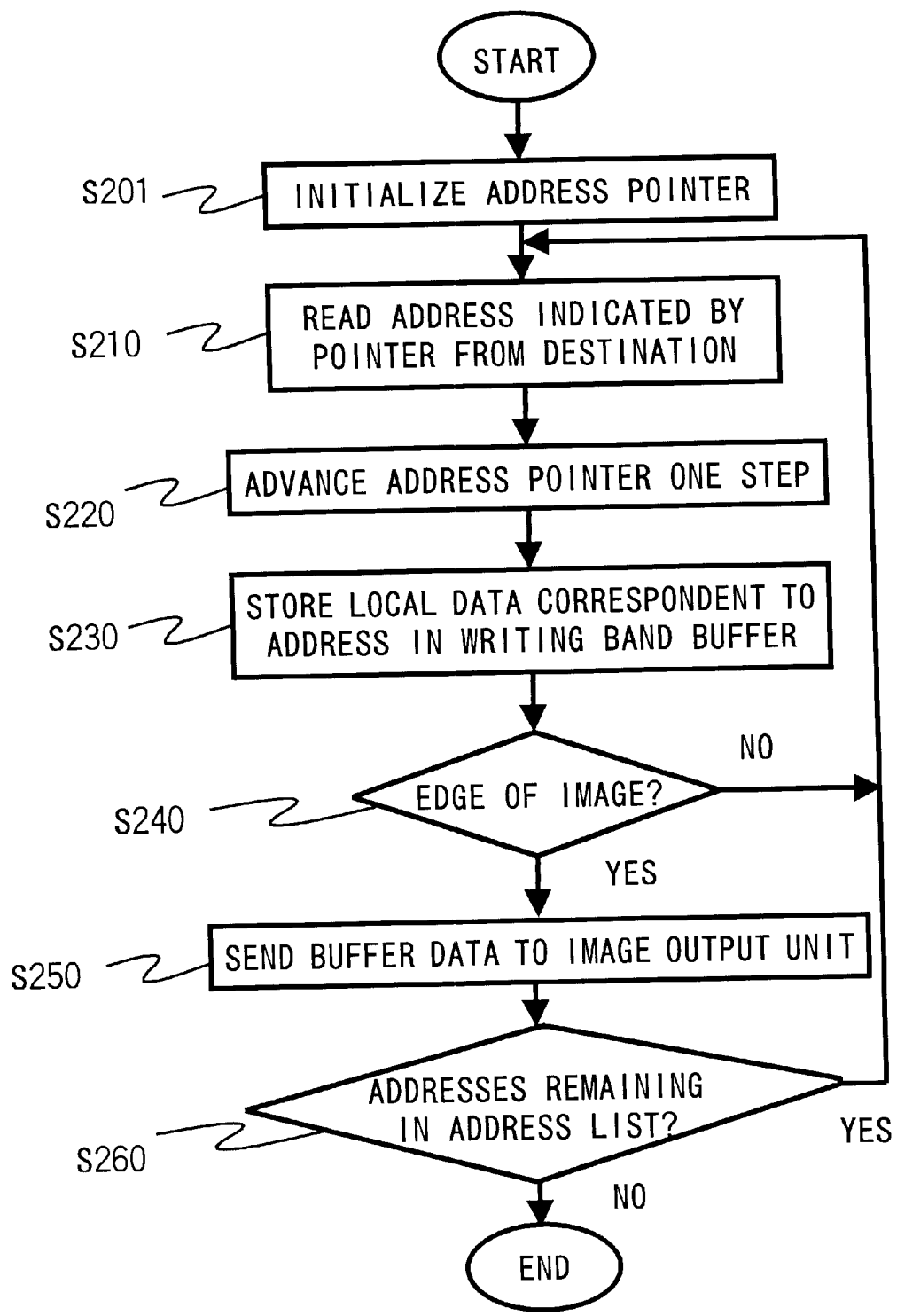
FIG. 8 is a flow chart showing the second part of the operation of the first embodiment of the present invention.

The operation of the first embodiment is illustrated in FIGS. 4, 5, and 8 based upon the above construction. FIG. 4 shows that the overall operation of the present embodiment can be divided into two parts. In step S100, the input image is divided into local data, transformed, and stored in the intermediate buffer 61 in the order of transformation. In step S200, the local data in the intermediate buffer 61 stored in the order of the sorted source side address are globally rotated(horizontally transferred) and output as the output image. Steps S100 and S200 are explained in further detail in FIGS. 5 and 8 respectively.

FIG. 5 shows step S100 in detail. In step S110, the destination side address list 250 and the source side address list 210 are generated. The source side address list is obtained by inversely transforming the destination side address list. In step S120, the source side address list 210 is sorted as to the y coordinates. In step S130, the address pointer, which specifies the address of the sorted source side address list 210 is initialized.

In step S140, one line of the input image data is read and input to the reading band buffer 41. In step S150, it is determined whether a n×n pixel data block, which becomes the local data with the address indicated by the address pointer at its center, exists in the band buffer 41. If all of the pixels of local data do not exist, the process returns to step S140 and another line of input image is read and input to the band buffer 41. If all of the pixels do exist, then the data of the n×n pixel data block is output in step S160.

In step S170, the local data is transformed according to the coordinate transformation table of the transforming ROM 52, and is stored in the intermediate buffer 61. In step S180, the address pointer of the source side address list 210 is advanced one step and prepared to process the next address. In step S190, it is determined if an address still exists in the sorted source side address list. If any exists, the process returns to step 150 and determines if any local data indicated by the address exists in the band data within the band buffer 41 which is read and updated in step S140. If, in step S190, there is no address left in the source side address list 210, all of the input image is locally transformed and stored in the intermediate buffer 61.

Figure 6A:
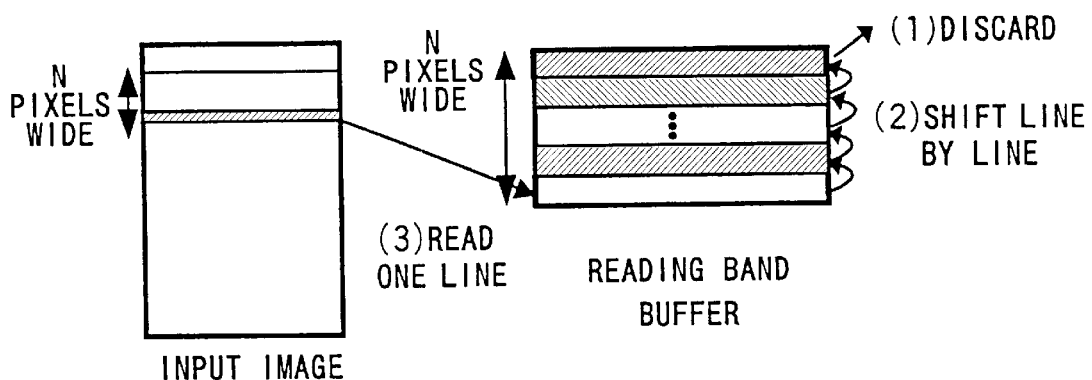
FIGS. 6(a) and (b) illustrate the reading band buffers of the first embodiment of the present invention.
Figure 6B:
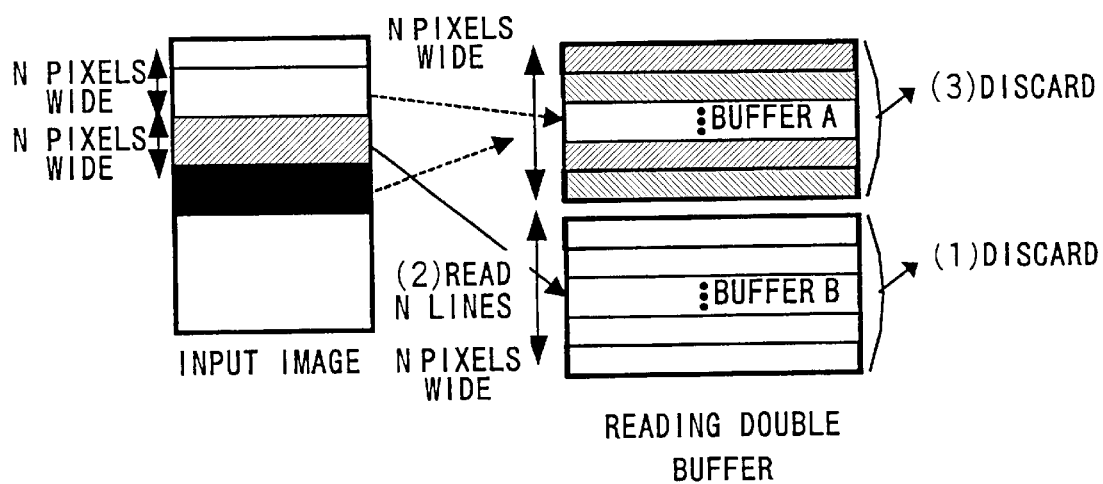

Among the above operations, the reading process of data into the reading band buffer is explained in further detail. FIG. 6(*a*) illustrates the flow of data in this process in the use of a ring buffer, wherein;

(1) The oldest line data in the ring buffer is discarded;

(2) The lines of line data following the one discarded in (1) each shift one place; and (3) After (n−1) lines of line data are shifted, a new line of data is read and input in the empty line buffer.

By using a ring buffer, it becomes possible to take out local data while reading data line by line from the input image. Furthermore, a double buffer may be utilized to enhance the efficiency of transferring data. FIG. 6(*b*) shows the flow of data when a double buffer is used as the reading band buffer 41, wherein:

(1) The data inside buffer B are discarded when all of the local data in the band buffer with the older data(buffer B, in this case) are read;

(2) The next n lines of line data of the input image are read and input into buffer B; and (3) After the local data in buffer A or data stored across both buffers A and B are read, the line data inside buffer A are discarded and buffer A prepares for reading of the next n lines of the input image.

The reading efficiency may be increased by using two band buffers which are n pixels wide. This is because it is possible to read n lines of data at a time.

Figure 17:
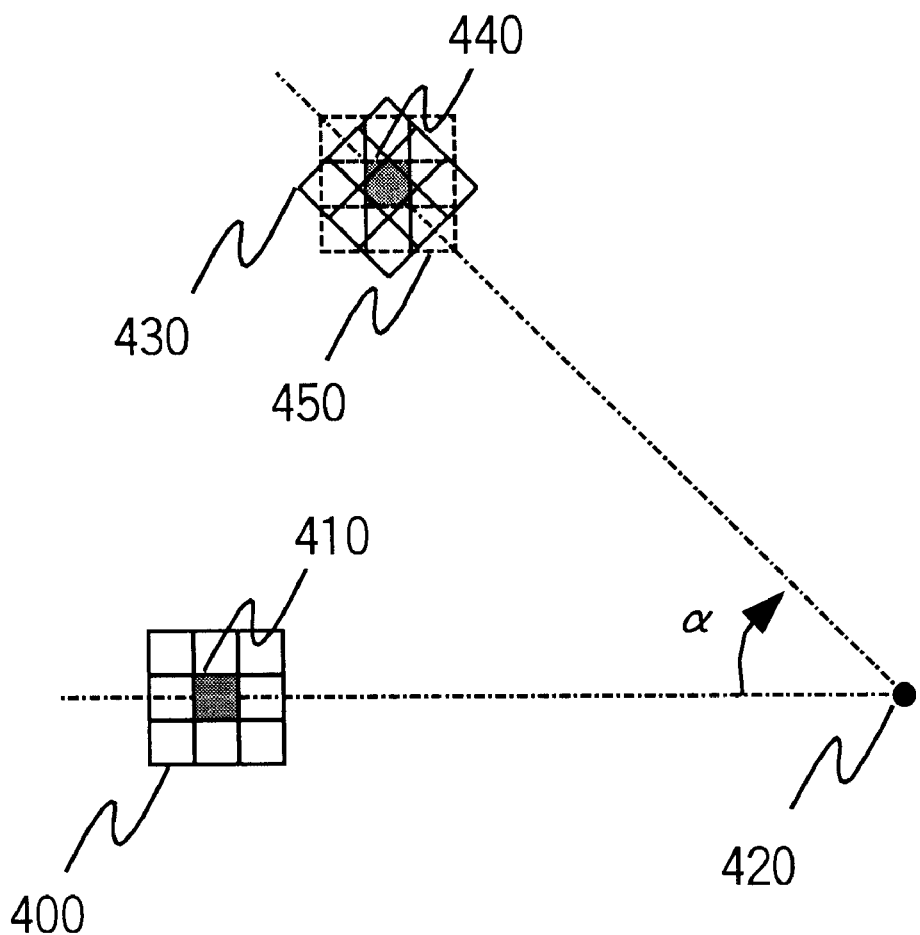
FIG. 17 shows a rotation process in the first example of the prior art apparatuses.
Figure 18:
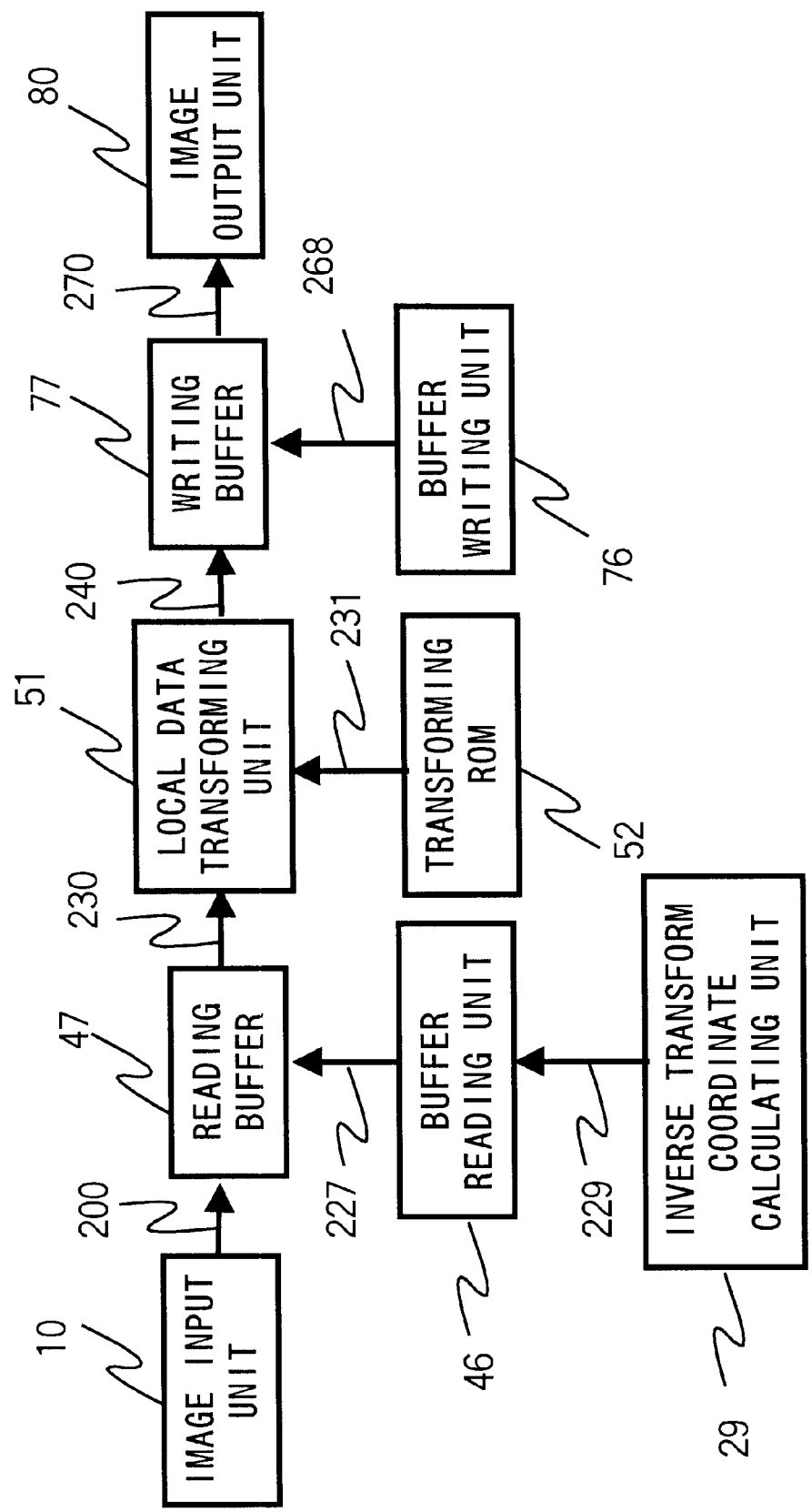
FIG. 18 is a block diagram illustrating the construction of an image processing apparatus according the second example of the prior art apparatuses.
Figure 19:
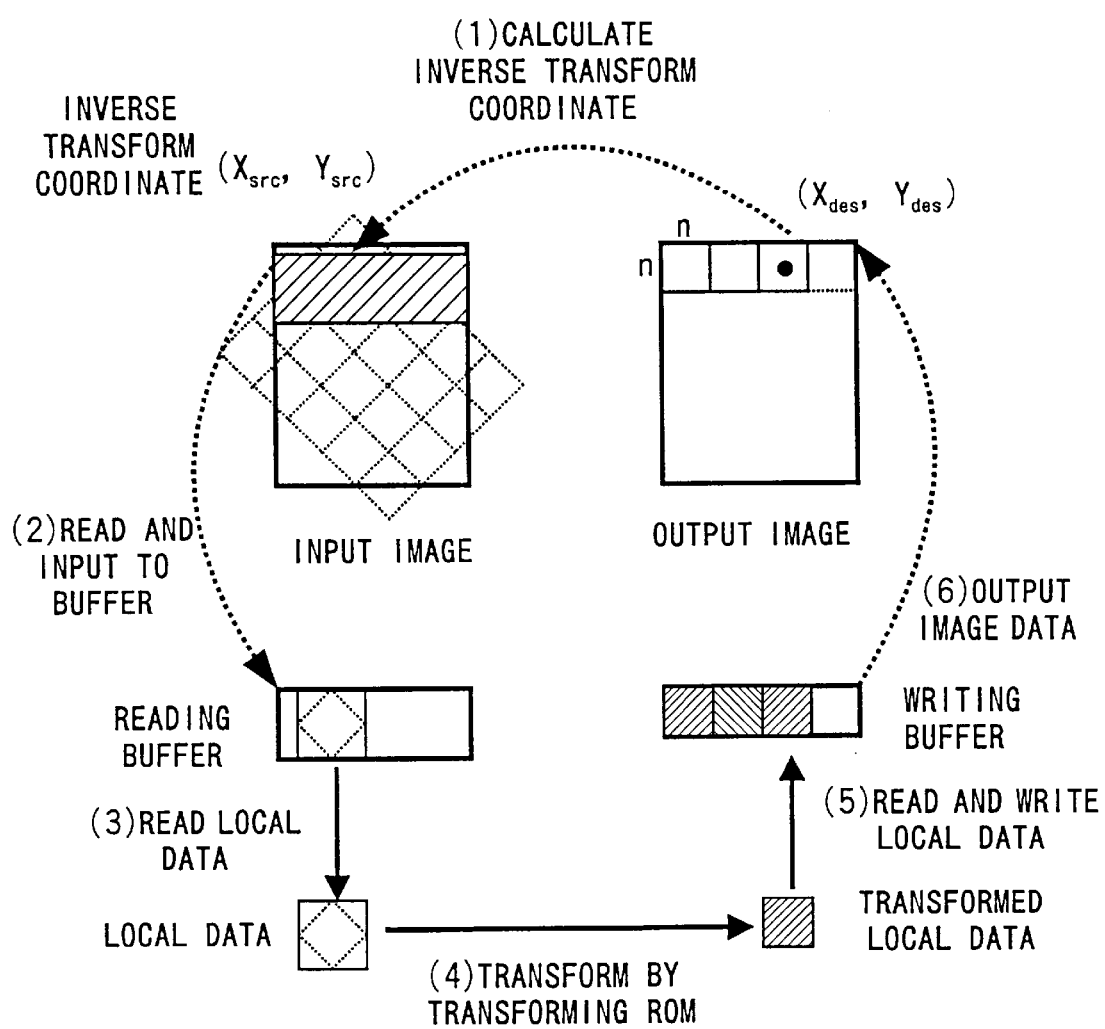
FIG. 19 shows the flow of data in the second example of the prior art apparatuses.

Next, step S170 in FIG. 5 will be explained in greater detail. Step S170 is the process in which local data is transformed and stored in the intermediate buffer 61. FIG. 7 shows an example of an address list and how the address list is generated. The following steps of FIG. 17 demonstrate the storing process of the local data into the intermediate buffer 61, wherein:

(1) The address list of all of the blocks of the destination side are generated (step S110 in FIG. 5);

(2) The addresses are inversely transformed, sorted as to the y coordinates and then generated as the source side address (step S120 in FIG. 5); and (3) The local data transformed in the order of the address of the source side are stored and the stored addresses are recorded in correspondence to the source side address.

With the above process, the data stored in the intermediate buffer 61, which correspond to the blocks of the destination side, can now be obtained from the address list.

Step S200 in FIG. 4 is shown in detail in FIG. 8. In step S201, the address pointer which specifies the address of the destination side address list is initialized. In step S210, the address indicated by the address pointer is read from the destination side address list 250. In step S220, the address pointer is advanced one step for the next process.

In step S230, the local data correspondent to the read destination side address is output from the intermediate buffer 61 and stored in the writing band buffer 71. In step S240, it is determined if the address indicated by the address pointer is of an edge of the image. If it is not, the process returns to step S210 and performs the process for the next address. If the address pointer is at an edge of the image, the process proceeds to step S250 and all of the data in the writing band buffer 71 is sent to the image output unit 80 in the order of the raster scan. In step S260, it is determined if any unprocessed addresses remain in the destination side address list 250. If any exists, step S210 is repeated for the next address. If none remain, all of the input image data stored in the intermediate buffer 61 have been output, and the process is terminated.

Figure 9:
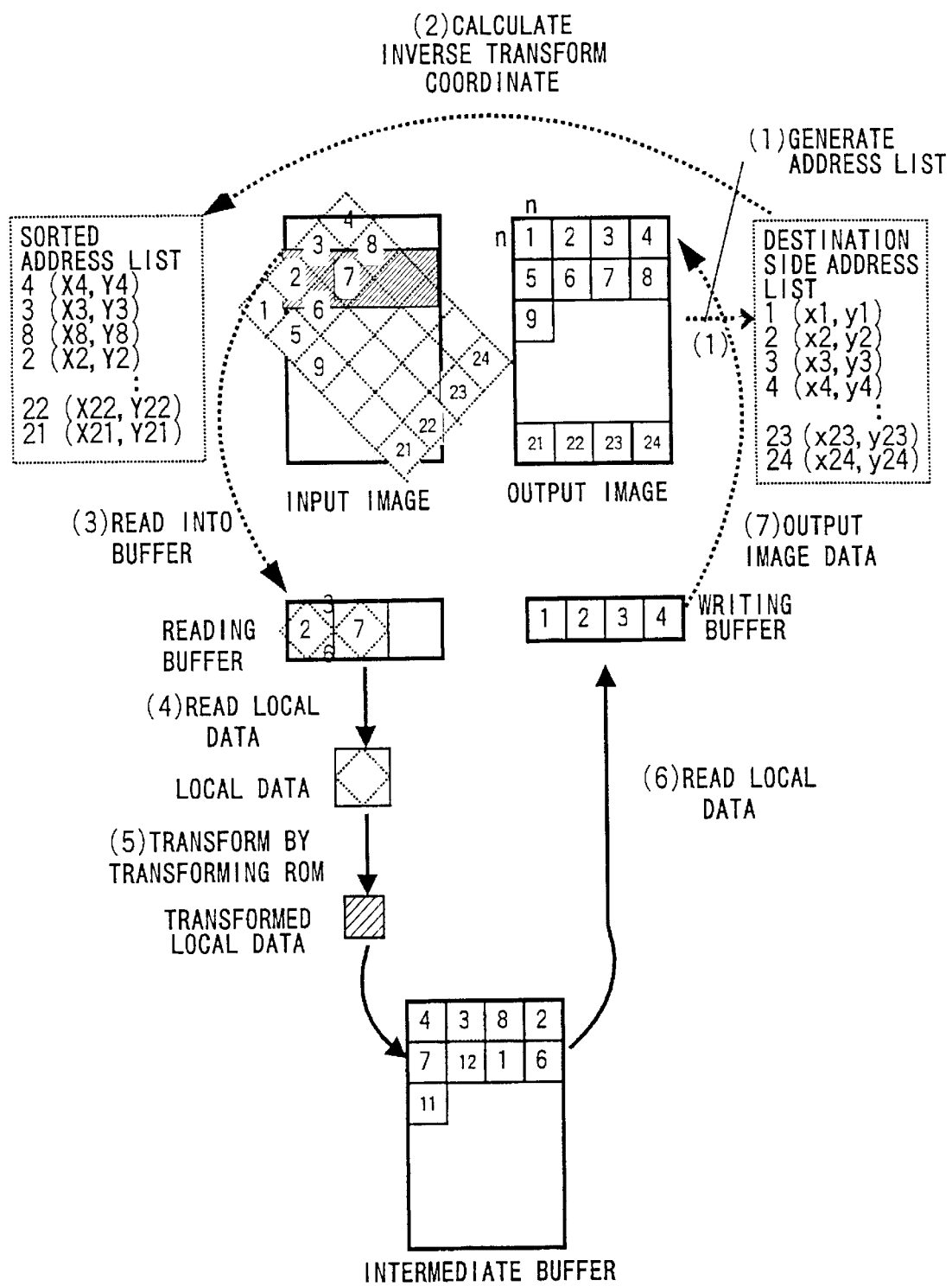
FIG. 9 shows a global process in the first embodiment of the present invention.

FIG. 9 illustrates the flow of data of this embodiment. As shown in FIG. 9:

(1) The center coordinates of the blocks (blocks 1~24) blocked at the destination side are obtained in the order of the raster scan and generated as the destination side address list 250;

(2) The coordinates obtained by inversely transforming the coordinates of the destination side address list 250 are sorted as to the y coordinates and generated as the source side address list 210;

(3) The input image is read and input to the band buffer 41 line by line;

(4) When local data having at its center the coordinate indicated by the address pointer exists in the band buffer 41, then the local data is read;

(5) The local data is transformed according to the transform coordinates in the transforming ROM 52, and is written in the intermediate buffer 61 in the order of transformation;

(6) When processing is finished for all of the addresses in the source side address list 210, the local data is read from the intermediate buffer 61 and input to the writing band buffer 71; and (7) When the address is of an edge of the image according to the destination side address list 210, the data in the writing band buffer 71 is output as the output image data. This process is performed for all of the addresses of the destination side address list 250.

In the first embodiment, the rotating process is done by the inverse transform method for local processing as well. Therefore, the transform coordinates stored in the transforming ROM 52 are inverse transform values. For example, when rotating an image forty-five degrees, the transform coordinates corresponding to those when the image is conversely rotated forty-five degrees (or rotated minus forty-five degrees) are calculated and stored in the transforming ROM. When data of each of the 8×8 pixel blocks are needed at the destination side, the block in the minimum circumscribed square of the reversely rotated block is taken out from the input image side and used.

Figures 10A, 10B:
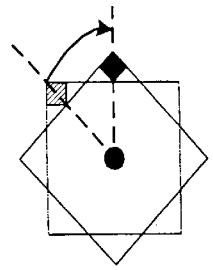
FIGS. 10(a) and (b) show an example of a local process in the first embodiment of the present invention.

FIGS. 10(*a*) and (*b*) show an example of the calculation of the transform coordinates of the transforming ROM 52. In this example, a 10×10 pixel block is rotated forty-five degrees into a 8×8 pixel block by the transforming ROM 52. The transform coordinates (P00~P77 in FIG. 10(*b*)) of the conversely rotated block correspondent to P00~P77 in FIG. 10(*a*), are stored in the transforming ROM 52. Therefore, the values of the transforming ROM 52 can be obtained by performing an inverse transform process using the following equation.

$$\begin{pmatrix} m_{rot} \\ n_{rot} \end{pmatrix} = \begin{pmatrix} \cos\theta & -\sin\theta \\ \sin\theta & \cos\theta \end{pmatrix} \times \begin{pmatrix} m \\ n \end{pmatrix} \quad (1)$$

In FIG. 10(*b*), since the coordinates obtained from the above equation are expressed as integers, there are cases where two pixels share the same coordinate (P10 and P00, for example). If high quality images are required, this can be solved by calculating the pixel values from the values of surrounding pixels by using high dimension interpolation equations. This can be easily realized by increasing the number of transformation tables within the transforming ROM 52.

Second Embodiment

Figure 11:
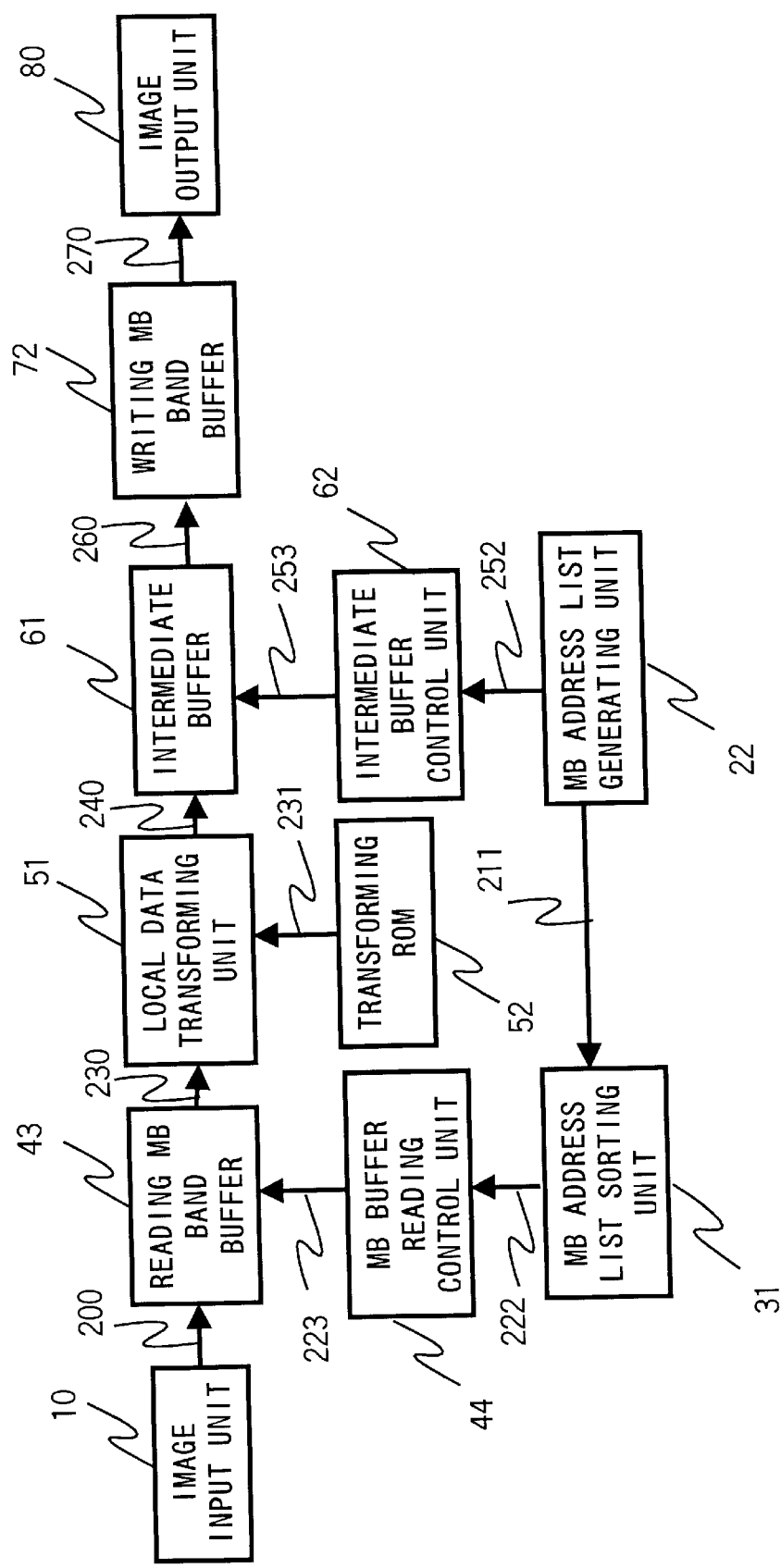
FIG. 11 is an exemplary block diagram illustrating the construction of a second embodiment of an image processing apparatus according to the present invention.

The second embodiment of the present invention performs a rotation process using macro block (MB) buffers. FIG. 11 is an exemplary block diagram showing the construction of the second embodiment.

Operation processes that differ from those of the first embodiment are explained here using FIG. 11. Those similar to those of the first embodiment are not discussed in detail. Macro block address list generating unit 22 sends out the destination side macro block address list 252 as well as the source side macro block address list 211 obtained by inversely transforming the destination side macro block address list 252. The macro block address list sorting unit 31 possesses the function to sort as to the y coordinates and outputs the macro block address list of the source side 222. The macro block buffer reading control unit 44 controls the reading macro block band buffer 43 based upon the source side macro block address list 222 by outputting control signals 223. A macro block band buffer is a band buffer large enough to contain a macro block. The writing macro block band buffer 72 stores all of the data in a macro block (referred to as macro block data from hereinafter) and successively sends out the macro block data.

Figure 12:
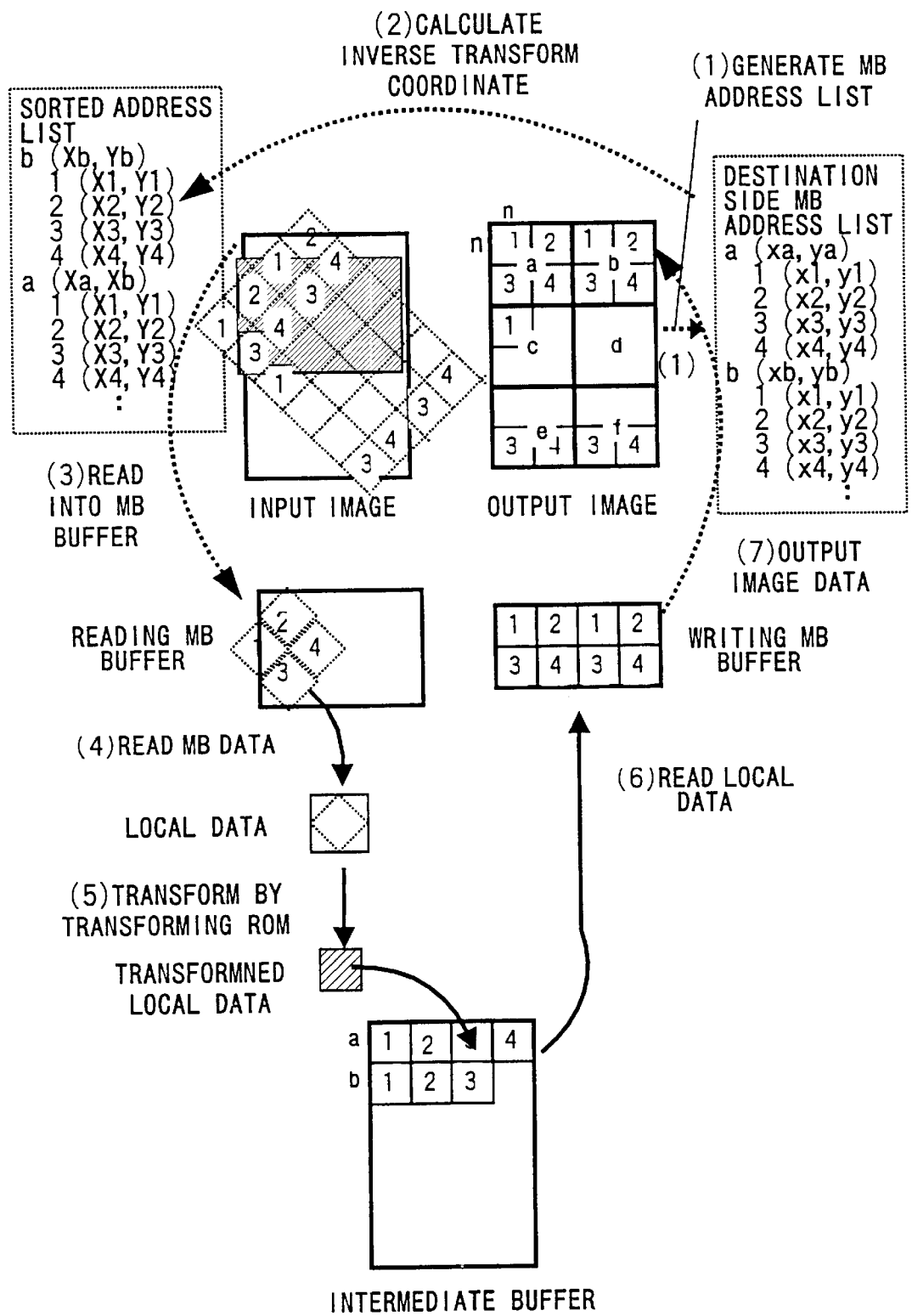
FIG. 12 shows a global process in the second embodiment of the present invention.

FIG. 12 illustrates the flow of data of this embodiment. Here again, the operations similar to those of the first embodiment are not discussed in detail. As shown in FIG. 12:

(1) Several of the blocks blocked at the destination side are grouped together into macro blocks (a~f) and the center coordinates of the macro blocks, as well as each blocks of the macro block, are obtained in the order of the raster scan and generated into the destination side macro block address list 252;

(2) The coordinates obtained by inversely transforming the coordinates of the destination side macro block address list are sorted as to the y coordinates and generated into the source side macro block address list 222. Only the center coordinates of the macro blocks themselves are sorted;

(3) The input image data is read and input to the macro block band buffer 43 line by line;

(4) When a macro block data which has at its center the coordinate indicated by the address pointer exists in the macro block band buffer 43, then each block of local data in the macro block data is read;

(5) The local data are transformed according to the transform coordinates in the transforming ROM 52 and the macro block data are written in the intermediate buffer 61 in the order of transformation;

(6) When the processing regarding the source side macro block address list 222 is completed, the macro block data is read from the intermediate buffer 61 into the writing macro block band buffer 72 according to the destination side macro block address list 252 generated in step (1); and (7) When the address is of an edge of the image according to the destination side address list 252, the data in the writing macro block band buffer 72 are output as the output image. This process is performed for all of the addresses of the destination side address list 252.

As discussed above, this embodiment utilizes macro blocks which are comprised of several blocks of pixel data. By using macro block band buffers which are large enough to store macro block data, it becomes possible to limit the number of addresses to be sorted to the number of macro blocks. For example, in FIG. 12, the amount of the sorting process is reduced by ¾ since one macro block is comprised of 4 blocks. Since the process of transforming local data is similar to that of the first embodiment, the hardware needed for the transformation does not need to be modified. Therefore, it is possible to reduce the process load by adopting macro blocks.

Furthermore, it is possible to lessen the process load even more by generating an address list only for the macro blocks themselves. With this method, the storing addresses of each of the blocks within a macro block can be obtained by simple addition-subtraction of the offset values between the blocks. In addition, the source side address list is accordingly only generated for the macro blocks thereby reducing the process load.

When storing data in the intermediate buffer, it is also possible to give one storing address to a cluster of several blocks. For example, in FIG. 12, one macro block consists of four blocks. This means that four storing addresses are necessary if each block is stored separately in the intermediate buffer. However, if the blocks in the same master scan direction are stored together, only two storing addresses are needed. In FIG. 12, namely, a1 and a2, a3 and a4 can be put together with one storing address. This enhances the efficiency when processing each block in the master scan direction at the destination side.

Third Embodiment

Figure 13:
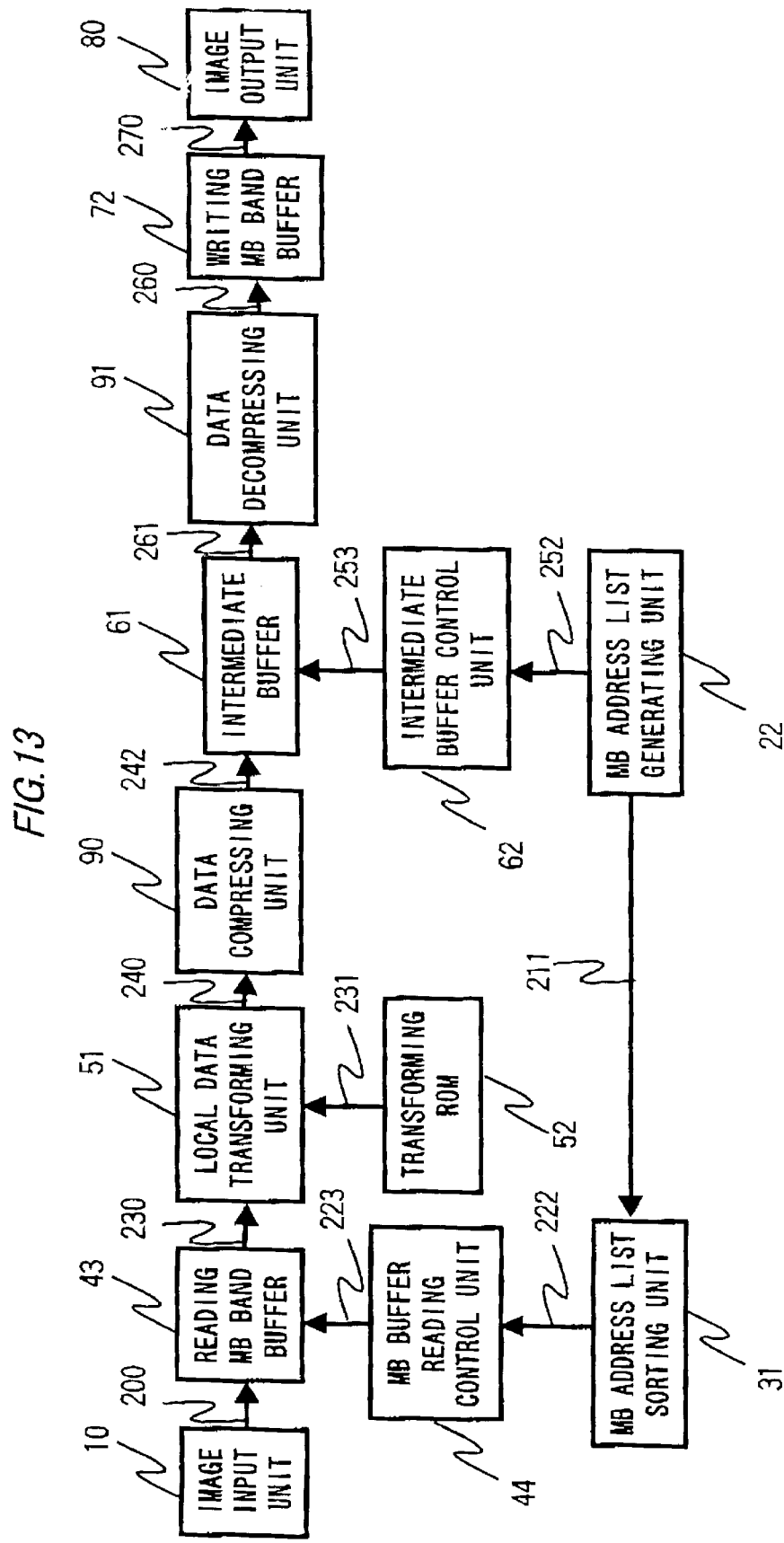
FIG. 13 is an exemplary block diagram illustrating the construction of a third embodiment of an image processing apparatus according to the present invention.

The third embodiment of the present invention uses, in addition to the processes mentioned in the first and second embodiments, a compressing process when storing data in the intermediate buffer 61. FIG. 13 is an exemplary block diagram illustrating the construction of this embodiment. Only the construction differing from the second embodiment is explained here.

The data compressing unit 90 compresses the local data and outputs the compressed local data 242. The compressed local data 261 stored in the intermediate buffer 61 is sent to the data decompressing unit 91 which decompresses the local data and outputs the decompressed local data 260.

In this embodiment, each of the local data are an n×n pixel data block. Therefore, by using jointly such block coding methods as JPEG (Joint Photographic Experts Group) with compression, it becomes possible to not only reduce the size of the intermediate buffer 61, but also to reduce the time needed to transfer data. One of the following frequency transfers can be adopted, for example, as the compression method of this embodiment: discrete cosine transform (DCT), discrete Fourier transform (DFT), discrete sine transform (DST), lapped orthogonal transform (LOT), Hadamard transform, Wavelet transform and sub-band coding.

The following equation provides a theoretical explanation of this embodiment and the fourth embodiment:

$$\begin{pmatrix} x' \\ y' \end{pmatrix} = \begin{pmatrix} a & b \\ b & d \end{pmatrix}\begin{pmatrix} x \\ y \end{pmatrix} + \begin{pmatrix} e \\ f \end{pmatrix} \qquad (2)$$

$$= \begin{pmatrix} a & b \\ c & d \end{pmatrix}\begin{pmatrix} X + \Delta x \\ Y + \Delta y \end{pmatrix} + \begin{pmatrix} e \\ f \end{pmatrix}$$

$$= \begin{pmatrix} a & b \\ c & d \end{pmatrix}\begin{pmatrix} \Delta x \\ \Delta y \end{pmatrix} + \begin{pmatrix} e'(X, Y) \\ f''(X, Y) \end{pmatrix}$$

In this equation, characters x and y are the coordinate values before affine transformation and characters x' and y' are the corresponding coordinate values after the affine transform. Characters a, b, c, and d represent the coefficient of the affine transform. Characters e and f represent the distance of horizontal transfer. Characters X and Y are the coordinate values in global processing and characters Δx and Δy are the coordinate values in local processing. Characters e'() and f''() show the distance of the horizontal transfer as calculated by the global processing.

As can be seen from this equation, the processes of the affine transform are divided into two parts. The two processes are expressed as the first and second terms of the equation, respectively. The first is the local processing of pixels and the other is the global processing of image parts. The two processes can be performed independently.

In this embodiment, the processing of the pixels of image parts are performed at the local data transforming unit 51 and the pixels are then compressed in the data compressing unit 90. The global process is performed when the data is written in the writing macro block band buffer 72. In this way, the image data is compressed when the second process is performed, thus reducing the time needed to transfer data or write into memory.

Forth Embodiment

Figure 14:
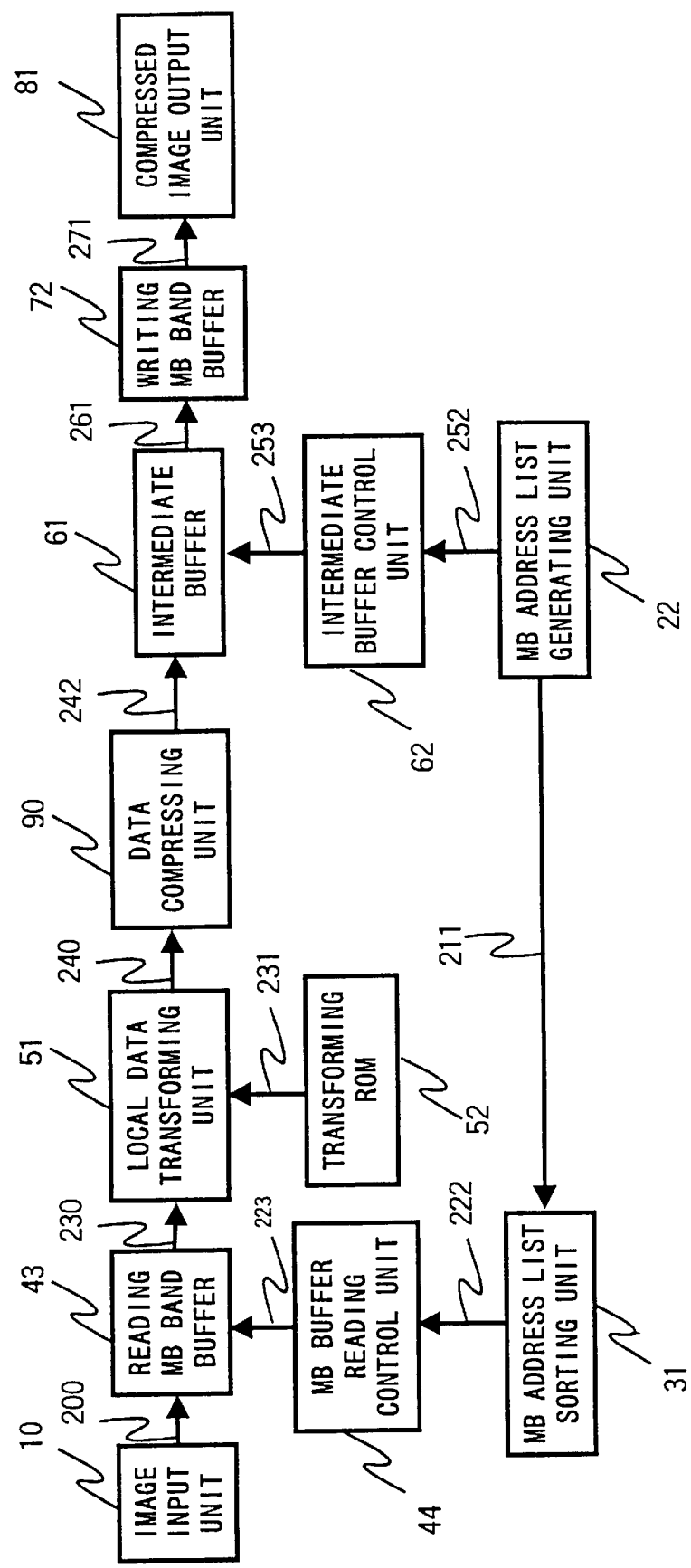
FIG. 14 is an exemplary block diagram illustrating the construction of a forth embodiment of an image processing apparatus according to the present invention.

The forth embodiment of the present invention eliminates the data decompressing unit 91 from the third embodiment and outputs the processed image data still in a compressed state. FIG. 14 is a block diagram illustrating the construction of this embodiment.

The construction differs from that of the third embodiment as explained here. The compressed image output unit 81 merges the compressed local data 271 and outputs a compressed output image.

Since images generally contain large amounts of data, compression is a common way to handle them. Although the compression process is usually performed after the image data is output, this embodiment enables local data to be transformed globally while still in a compressed form. When such block coding methods as JPEG is used, it becomes necessary to code the difference of the DC components of each block. This, however, can be performed simultaneously in the compressed image output unit 81.

Although only the rotation process is discussed in each of the above embodiments, it is also possible to perform enlargement or reduction processes either in combination with rotation or not. The reason for this is that since rotation, enlargement and reduction processes are all concerned with address transforming processes, it is possible to perform all types of processing by changing equation (1). A combination of processes can be performed by combining equations for each of the processes. The possible combinations are a combination of rotation and enlargement and a combination of rotation and reduction. When simply performing enlargement or reduction processes, it is only necessary to recalculate the magnification.

Fifth Embodiment

Figure 15:
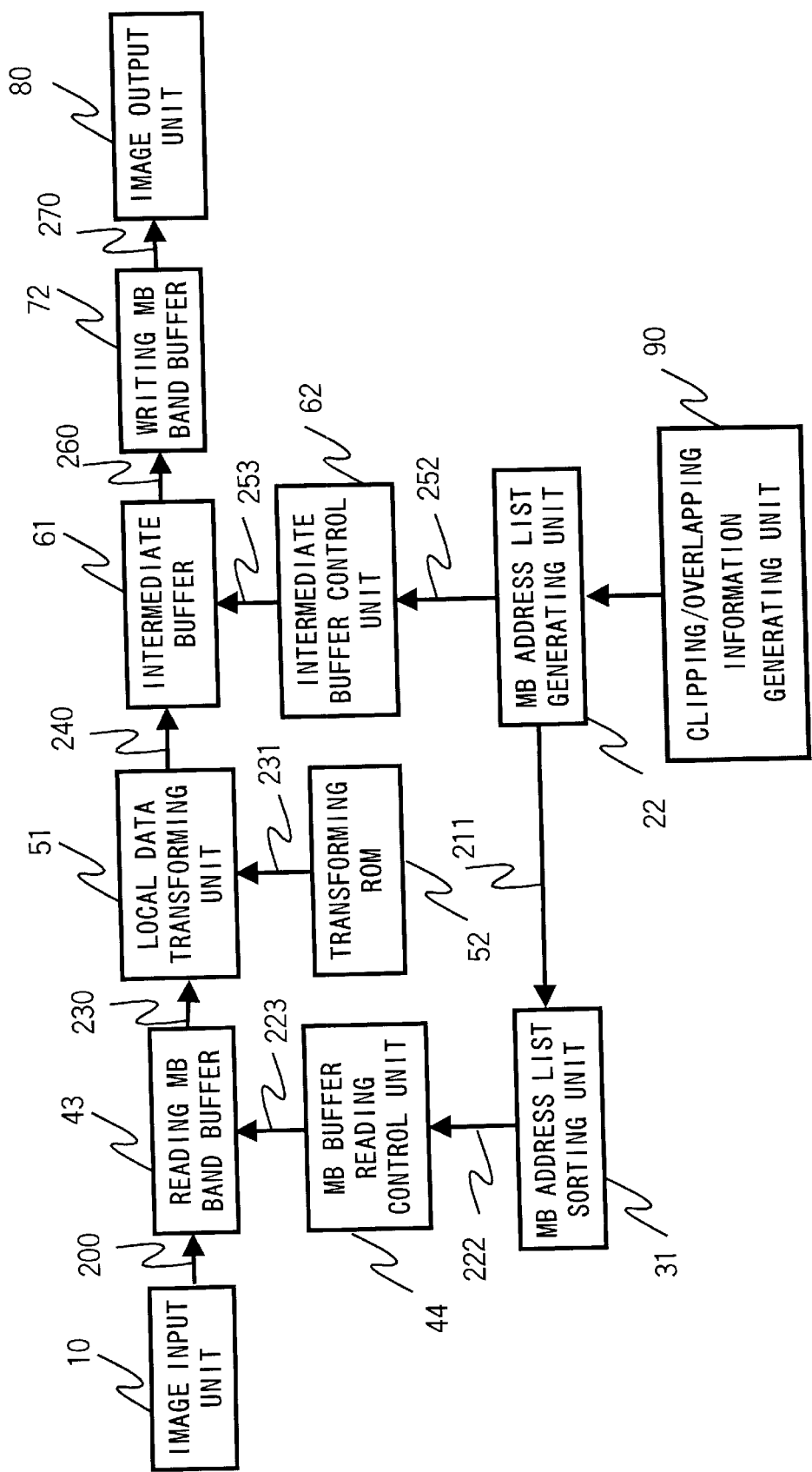
FIG. 15 is an exemplary block diagram illustrating the construction of a fifth embodiment of an image processing apparatus according to the present invention.
Figure 16:
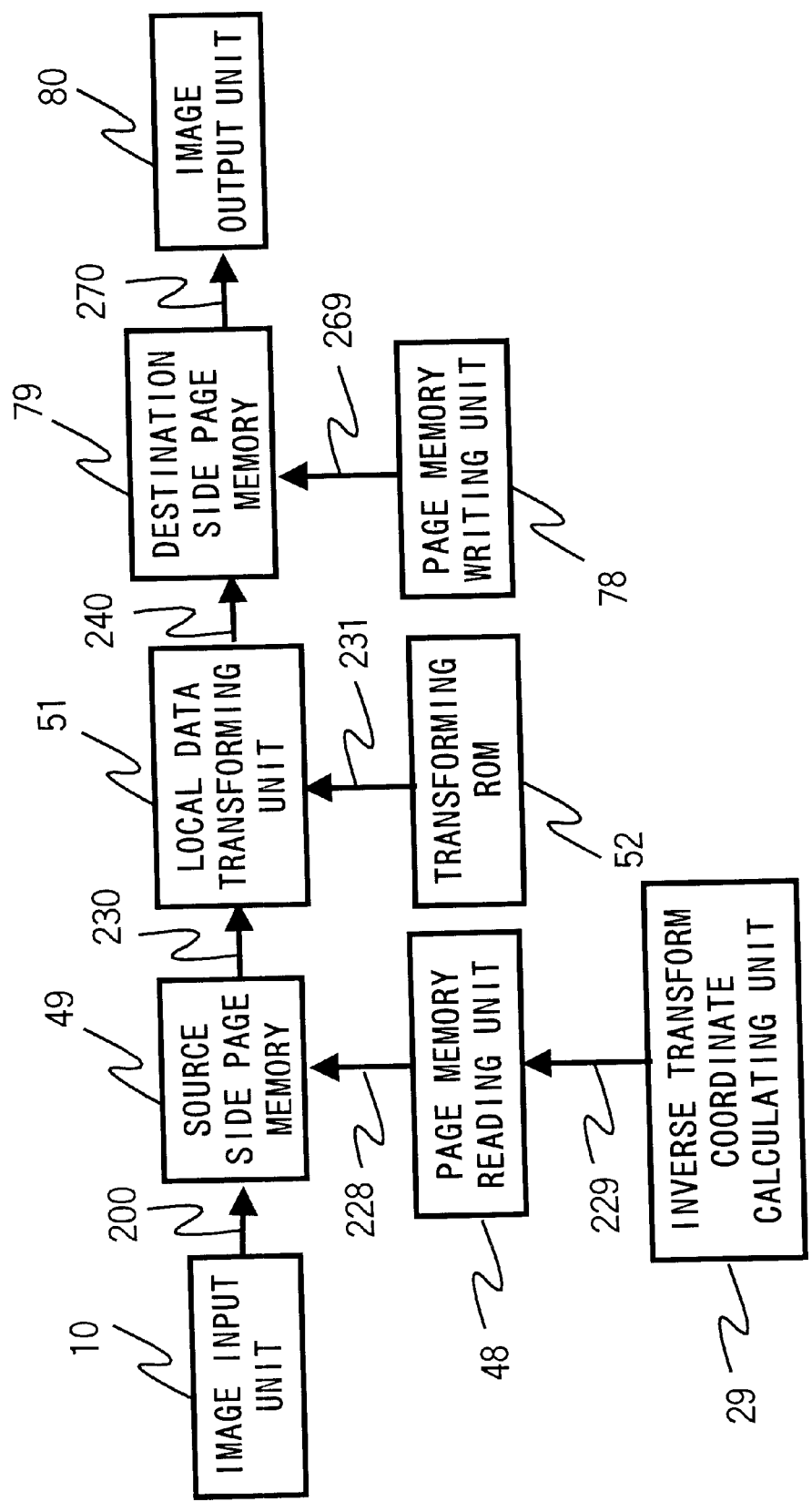
FIG. 16 is a block diagram illustrating the construction of an image processing apparatus according to the first example of the prior art apparatuses.

The fifth embodiment of the present invention performs clipping or overlapping processes of a plural number of raster images along with a rotation process. FIG. 15 is a block diagram illustrating the construction of this embodiment.

The construction differs from that of the second embodiment as explained here. The clipping/overlapping information generating unit 90 generates clipping/overlapping information from the positions of a plural number of raster images and their configuration information, and sends the clipping/overlapping information 280 to the macro block address list generating unit 22.

Clipping is a process that cuts out an area of a raster image according to its mask data. When the mask data is an edge list, there is no need for a page memory. However, a page memory is needed when the mask data is not constructed in the order of the raster scan. Overlapping is a process which lays on top of one another a plurality of raster data input in the order of the raster scan according to their position information. Therefore, in order to generate an input image, it is necessary to perform raster scan for all of the overlapping raster data. This means that there is a need for a page memory for both clipping and overlapping processes since the order of input and output differs as in a rotation process. Furthermore, clipping processes accompanied by overlapping need to be performed for each pixel according to overlapping information such as edge lists. Thus, even data access alone would be massive.

Taking into consideration the above, the present embodiment divides clipping and overlapping processes into local processing and global processing as in the rotating process described above. This means that clipping and/or overlapping of pixels is performed for each of the local data and clipping and/or overlapping of local data is performed globally.

As shown in FIG. 15, the addresses of each block of local data is generated according to the clipping/overlapping information only if they are included in the local area which will appear at the top of the output image. For example, when overlapping raster images A and B, if both raster images A and B exist together in a block, then both raster images generate the block address. If raster image A is completely hidden behind raster image B, only the address for raster image B is generated in this block. Therefore, when the blocks written in the intermediate buffer 61 do not include borders of the raster image, they are written directly into the writing macro block band buffer 72. If they include borders of the raster images, then local processing is performed upon each pixel in the writing macro block band buffer 72.

As shown in the above, this embodiment performs clipping and overlapping processes without using page memories even when no rotation process is involved. Therefore, it becomes possible to divide clipping and overlapping processes into local processing and global processing, thus reducing the time for calculation. Furthermore, when performing rotating processes together with either or both clipping and overlapping processes, the need to rotate the data of the local area that will be hidden is eliminated, therefore also reducing the time for calculation.

Although only clipping, overlapping and rotation processes are discussed in the present embodiment, it is also possible to perform any combination of clipping, overlapping, rotation, enlargement and reduction.

The address list in each of the embodiments are generated in a computer of the present invention and the memory storing the address list is accessible by the computer or a CPU. The computer performs affine transformation upon image data according to the address list.

As shown in FIGS. 1, 3, 11, and 13–15, the method of this invention is preferably implemented on a programmed processor. However, the image processing apparatus can also be implemented on a general purpose or special purpose computer, a programmed microprocessor or micro controller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowcharts shown in FIGS. 2, 4, 5, and 8 can be used to implement the image processing functions of this invention. Furthermore, the elements of FIGS. 1, 3, 11 and 13–15 may be embodied in hardware, software or a combination of hardware and software.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be mde without departing from the spirit and scope of the invention.

What is claimed is:

1. An image processing apparatus comprising:
    an image data input unit that inputs image data;
    a first data storing unit that stores a portion of the image data;
    a local data transform unit that performs a predetermined image processing upon each local data that constitutes each of the portions of the image data to generate transformed local data, wherein the predetermined image processing processes the image data of a single image;
    a transformed data storing unit that stores the transformed local data in the local data transform unit:
    a global data transform unit that performs a predetermined image processing upon the transformed local data after completing the local data transform processing;
    a second data storing unit that stores the transformed local data in output order;
    an address control unit that controls a reading order of the first data storing unit and the transformed data storing unit; and
    an image output unit that outputs the transformed local data stored in the second data storing unit as output image data.

2. The image processing apparatus as set forth in claim 1, wherein the first and second data storing units include at least one of a ring buffer and a double buffer.

3. The image processing apparatus as set forth in claim 1, wherein the address control unit performs processing in macro blocks comprising of two or more local data.

4. The image processing apparatus as set forth in claim 1, wherein the transformed data storing unit comprises:
    an image compressing unit that compresses the transformed local data; and
    a compressed data storing unit that stores the compressed transformed local data, wherein the transformed local data stored in the second data storing unit and output by the image output unit are compressed transformed local data.

5. The image processing apparatus as set forth in claim 4, wherein the address control unit controls the data compressed in the image compressing unit.

6. The image processing apparatus as set forth in claim 4, wherein the image compressing process divides images into blocks and codes them.

7. The image processing apparatus as set forth in claim 4, wherein the image compressing unit compresses the transformed local data using at least one of a discrete cosine transform, a discrete Fourier transform, a discrete sine transform, a lapped orthogonal transform, a Hadamard transform, a Wavelet transform, and a sub-band coding.

8. The image processing apparatus as set forth in claim 1, wherein the address control unit comprises:

an address list generating unit that generates an address list that provides the relationship between the coordinates of the input image data and the output image data; and an address list sorting unit that rearranges the address list according to a processing order of the input image data, wherein the image processing performed by the local data transform unit is at least one of rotation, enlargement or reduction.

9. The image processing apparatus as set forth in claim 8, wherein the address control unit further comprises at least one of a clipping information generating unit and an overlapping information generating unit that outputs at least one of clipping information and overlapping information, and wherein the address list generating unit generates the address list according to a processing order of the output image data based upon at least one of the clipping information and the overlapping information.

10. The image processing apparatus as set forth in claim 1, wherein the address control unit further comprises:

at least one of a clipping information generating unit and an overlapping information gathering unit that outputs at least one of clipping information and overlapping information;

an address list generating unit that generates the address list that provides the relationship between the coordinates of the input image data and the output image data according to a processing order of the output image based upon at least one of the clipping information and the overlapping information;

and an address list sorting unit that rearranges the address list according to the processing order of the input image data, wherein the image processing performed by the local data transform unit is at least one of rotation, enlargement, reduction, clipping and overlapping.

11. An image processing apparatus that performs image processing by dividing the process into local processing and global processing, comprising:

an image input unit that inputs image data;

a first data storing unit that stores parts of the input image in the order of input;

a local data transform unit that extracts local data from parts of the image data stored in the first data storing unit and transforms the local data by performing local processing upon the local data to generate transformed local data, wherein the local processing processes the local data of a single image;

a transformed data storing unit that stores the transformed local data;

a global data transform unit that performs a predetermined image processing upon the transformed local data after the local data transform processing;

a second data storing unit that stores portions of the transformed local data, the portions of the transformed local data being extracted from the transformed data storing unit in correspondence with the global processing; and an image output unit that outputs output image data based on the portions of the transformed local data stored in the second data storing unit.

12. The image processing apparatus as set forth in claim 11, wherein the first and second storing units include at least one of a ring buffer and a double buffer.

13. The image processing apparatus as set forth in claim 11, further comprising:

an address control unit that controls the reading order of data stored in the first data storing unit and the transformed data storing unit;

an image compressing unit that compresses the transformed local data to generate compressed transformed local data;

a compressed data storing unit that stores the compressed transformed local data;

at least one of a clipping information generating unit and an overlapping information generating unit that outputs at least one of clipping and overlapping information;

an address list generating unit that generates an address list that provides the relationship between the coordinates of the input image data and the output image data based upon at least one of the clipping information and the overlapping information; and an address list sorting unit that rearranges the address list according to the processing order of the input image data, wherein the image processing performed by the local data transform unit is at least one of rotation, enlargement, reduction, clipping and overlapping.

14. The image processing apparatus as set forth in claim 13, wherein the image compressing unit compresses the transformed local data using at least one of a discrete cosine transform, a discrete Fourier transform, a discrete sine transform, a lapped orthogonal transform, a Hadamard transform, a Wavelet transform, and a sub-band coding.

* * * * *